US010495062B2

(12) United States Patent
Kjær et al.

(10) Patent No.: US 10,495,062 B2
(45) Date of Patent: Dec. 3, 2019

(54) POWER RAMPING A TURBINE FROM A LOW-POWER MODE

(71) Applicant: VESTAS WIND SYSTEMS A/S, Aarhus N (DK)

(72) Inventors: Martin Ansbjerg Kjær, Harlev J (DK); Robert Bowyer, London (GB); Robert Grøn-Stevens, Randers (DK); Jacob Deleuran Grunnet, Aarhus C (DK); Carsten Nørlund Thomsen, Langå (DK); Jesper Sandberg Thomsen, Hadsten (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 154 days.

(21) Appl. No.: 15/554,356

(22) PCT Filed: Feb. 29, 2016

(86) PCT No.: PCT/DK2016/050056
§ 371 (c)(1),
(2) Date: Aug. 29, 2017

(87) PCT Pub. No.: WO2016/138906
PCT Pub. Date: Sep. 9, 2016

(65) Prior Publication Data
US 2018/0051675 A1 Feb. 22, 2018

(30) Foreign Application Priority Data
Mar. 5, 2015 (DK) .................. 2015 70122

(51) Int. Cl.
F03D 7/02 (2006.01)
G05B 15/02 (2006.01)

(52) U.S. Cl.
CPC ......... *F03D 7/0284* (2013.01); *F03D 7/0224* (2013.01); *F03D 7/0276* (2013.01);
(Continued)

(58) Field of Classification Search
CPC .... F03D 7/0224; F03D 7/0276; F03D 7/0284; F05B 2220/706; F05B 2270/1033;
(Continued)

(56) References Cited

U.S. PATENT DOCUMENTS

2007/0018457 A1  1/2007  Llorente Gonzalez
2007/0205602 A1  9/2007  Willey et al.
(Continued)

FOREIGN PATENT DOCUMENTS

CN  102062051 A  5/2011
CN  102076959 A  5/2011
(Continued)

OTHER PUBLICATIONS

International Search Report and Written Opinion from International Application No. PCT/DK2016/050056, dated Jun. 1, 2016.
Danish Search Report dated Oct. 5, 2015 in Danish Application No. PA 2015 70122.
Chinese Office Action for Application No. 201680013731.7 dated Nov. 14, 2018.

*Primary Examiner* — Yuhui R Pan
(74) *Attorney, Agent, or Firm* — Patterson + Sheridan, LLP

(57) ABSTRACT

Embodiments herein describe varying the rotor speed based on the current wind speed when operating in a low power mode. Generally, as the wind speed increases above the rated wind speed (i.e., the wind speed at which the turbine is capable of producing its rated or maximum output power), the rotor speed can be reduced thereby minimizing the risk that the turbine experiences smearing or torque reversals. In one embodiment, as the rotor speed decreases, the turbine maintains the ability to ramp to the rated power of the turbine only by pitching in the blades to an optimal blade
(Continued)

pitch angle. Thus, upon receiving a request to cease operating in the low power mode, the turbine can increase the output power to the rated power without first increasing the rotor speed.

18 Claims, 6 Drawing Sheets

(52) U.S. Cl.
CPC ........ *G05B 15/02* (2013.01); *F05B 2220/706* (2013.01); *F05B 2270/1033* (2013.01); *F05B 2270/32* (2013.01); *F05B 2270/327* (2013.01); *F05B 2270/328* (2013.01); *F05B 2270/337* (2013.01); *Y02E 10/723* (2013.01); *Y02E 10/725* (2013.01)

(58) Field of Classification Search
CPC ............ F05B 2270/32; F05B 2270/327; F05B 2270/328; F05B 2270/337; G05B 15/02; Y02E 10/723
See application file for complete search history.

(56) References Cited

U.S. PATENT DOCUMENTS

| | | | |
|---|---|---|---|
| 2008/0136188 A1 | 6/2008 | Krueger | |
| 2010/0286835 A1* | 11/2010 | Nyborg | F03D 7/0224 700/287 |
| 2012/0104755 A1 | 5/2012 | Hashimoto et al. | |
| 2012/0205912 A1* | 8/2012 | Wakasa | F03D 7/0284 290/44 |
| 2014/0167416 A1* | 6/2014 | Perley | F03D 7/0272 290/44 |
| 2015/0267686 A1* | 9/2015 | Kjær | F03D 7/0224 290/44 |

FOREIGN PATENT DOCUMENTS

| | | |
|---|---|---|
| CN | 103459838 A | 12/2013 |
| EP | 1923568 A2 | 5/2008 |
| WO | 2010000648 A2 | 1/2010 |
| WO | 2013010332 A1 | 1/2013 |
| WO | 2014026688 A1 | 2/2014 |

* cited by examiner

POWER RAMPING A TURBINE FROM A LOW-POWER MODE

BACKGROUND

Field of the Invention

Embodiments presented in this disclosure generally relate to varying the speed of a rotor in a wind turbine when operating in a low power mode. More specifically, embodiments disclosed herein vary the rotor speed while operating in a low power mode based on a changing wind speed.

Description of the Related Art

Grid compliance in some countries requires wind turbines to quickly ramp from a low (de-rated) output power to full production (i.e., a wind-optimal output power). For example, a grid code may require the turbines in a wind park to operate in a low power mode upon request so that the turbines are de-rated to output a fraction of the optimal output power for a given wind speed. But when output power decreases, the torque on the rotor also decreases assuming the rotational speed is maintained. As the torque on the rotor decreases, the risk that smearing in the drive train (when ball bearings begin to slide rather than rotate) will occur also increases which can damage the turbine. Moreover, when torque is low, the turbine may generate negative torque which can harm the gear box and significantly reduce its lifespan. To reduce the likelihood of smearing and torque reversals, the rotor speed is decreased when operating in the low power mode thereby preventing the average torque from falling in a range where the drive train or gear box may be damaged.

In addition to requiring the turbines to be capable of operating in a low power mode, some grid codes require that turbines can be ramped back to full production within a short time—e.g., 15 seconds. However, current turbine may be unable to achieve these fast ramp times.

SUMMARY

One embodiment of the present disclosure is a method for operating a wind turbine. The method includes operating, using one or more processors, the wind turbine in a low power mode that de-rates an output power of the wind turbine and varying a speed of a rotor in the wind turbine while operating in the low power mode based on changing wind speeds at the wind turbine. Upon receiving a request to cease operating in the low power mode, the method includes increasing the output power of the wind turbine by pitching blades of the rotor.

Another embodiment of the present disclosure is a wind turbine that includes a rotor comprising one or more blades and a controller. The controller is configured to operate the wind turbine in a low power mode that de-rates an output power of the wind turbine and vary the speed of the rotor while operating in the low power mode based on changing wind speeds. The controller is configured to increase the output power of the wind turbine by pitching the one or more blades of the rotor after ceasing to operate in the low power mode.

Another embodiment of the present disclosure is a computer-readable storage medium that includes program code which, when executed on a processor, performs an operation that includes operating a wind turbine in a low power mode that de-rates an output power of the wind turbine. The operation also includes varying a speed of a rotor in the wind turbine while operating in the low power mode based on changing wind speeds and increasing the output power of the wind turbine by pitching blades of the rotor after ceasing to operate in the low power mode.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
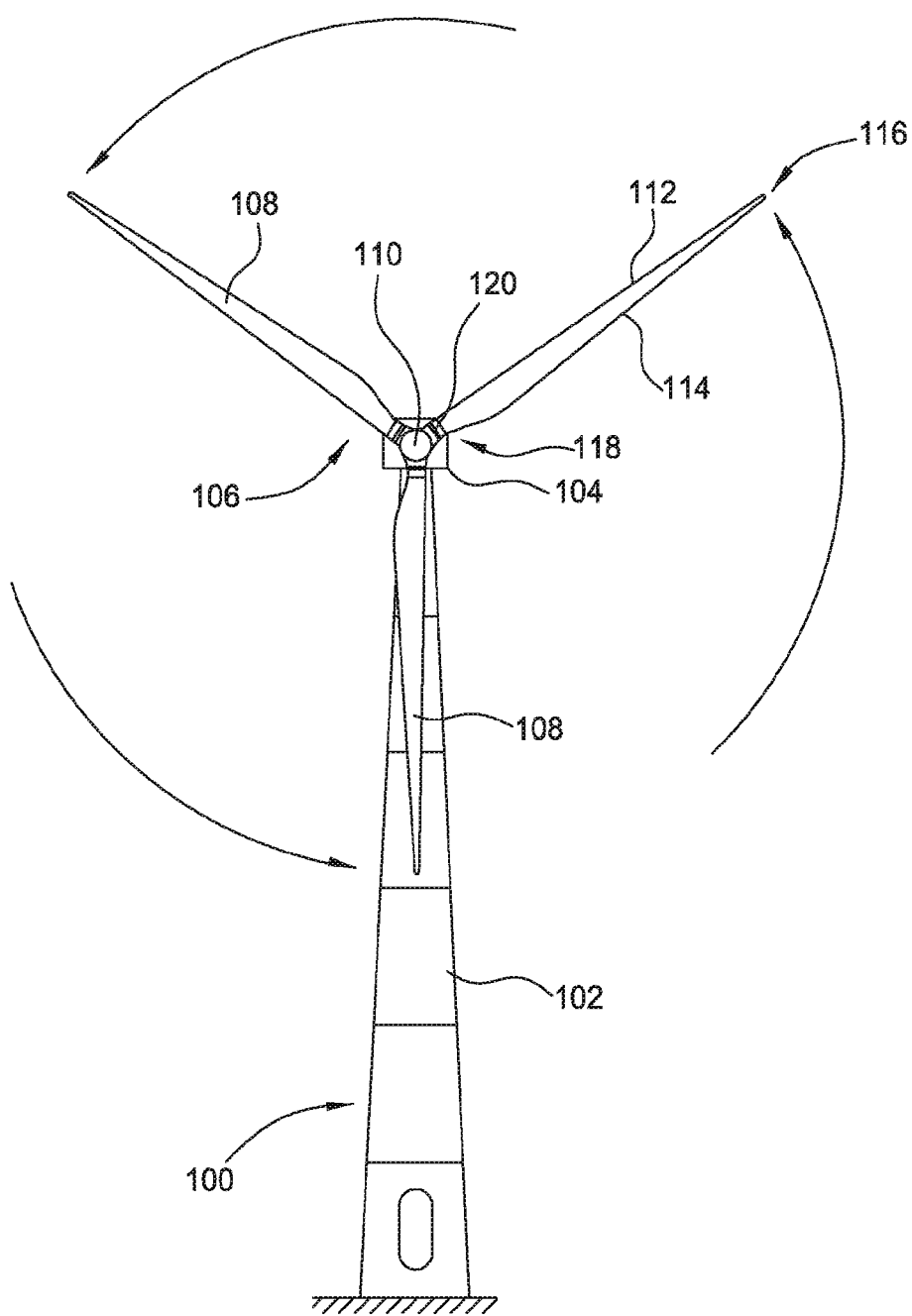
FIG. 1 illustrates a diagrammatic view of a wind turbine, according to an embodiment described herein.

When ramping (i.e., increasing) output power from a de-rated power value, a wind turbine may issue power requests to a power converter to increase the output power of the turbine. However, these requests generate a torque which will slow down the rotor and may cause a low-speed shutdown. To compensate for the increased torque imposed by ramping the power, the blades may be pitched in thereby extracting additional energy from the wind. However, if when operating in a low power mode the rotor is slowed down below what is the aerodynamically optimal rotor speed (in order to prevent smearing and torque reversals as described above), even if the blades are pitched to the optimal pitch angle, the turbine may be unable ramp to the requested power—e.g., the wind-optimal output power of the turbine. To finish ramping to the requested power, the turbine may enter a partial-load operation where the power ramping stops (or slows down) so that the rotor speed can be increased to improve aerodynamic efficiency. Operating in partial load mode, however, results in the output power ramping much slower than ramping the output power by pitching in the blades—e.g., 30 to 40 seconds versus 3-4 seconds. As such, ramping from a low power mode to the wind-optimal power when operating in a low power mode with slow rotor speeds may not satisfy a stringent grid code that requires fast ramping.

To ramp quickly from a low power mode to full production, the rotor speed may be kept at the optimal aerodynamic speed, which, for wind speeds greater than the rated wind speed of the turbine is the maximum speed of the rotor. Thus, whenever a request is received from the grid to output full production—i.e., the wind-optimal output power—the turbine need only pitch in the blades to their optimal angle to output the optimal output power. This power ramp can take only a few seconds. However, as above, maintaining the rotor speed at the optimal rotor speed for the current wind conditions may cause smearing or torque reversals that can reduce the lifetime of the drive train or gear box in the turbine. Instead of maintaining the rotor speed at the optimal speed when in the low power mode, the embodiments herein describe varying the rotor speed based on the current wind speed. Generally, as the wind speed increases above the rated wind speed (i.e., the wind speed at which the turbine is capable of producing its rated or maximum output power) the rotor speed can be reduced thereby minimizing the risk that the turbine will experience smearing or torque reversals. In one embodiment, as the rotor speed decreases, the turbine maintains the ability to ramp the output power to the rated power of the turbine only by pitching in the blades to an optimal blade pitch angle. Thus, upon receiving a request to cease operating in the low power mode, the turbine can increase the output power to the rated power without first increasing the rotor speed. In one example, the time required to ramp the output power from a de-rated power outputted during a low-power mode to the rated power is the time needed to pitch the blades to the optimal pitch angle (e.g., a few seconds).

In other embodiments, a controller in the turbine ensures that the turbine can ramp up to a predefined percentage of the wind-optimal output power by pitching in the blades (e.g., 90% of the optimal output power) when operating in the low-power mode. Like above, when the wind speed increases beyond the rated wind speed, the controller can decrease the rotor speed and still guarantee that the output power can be ramped to 90% of the wind-optimal output power when the blades are pitched in. When receiving a request to ramp to full production, the output power of the turbine ramps from the de-rated power (e.g., 10% of the optimal output power) to 90% of the wind-optimal output power in a matter of seconds by pitching in the blades. After achieving 90% of the wind-optimal output power, the turbine can stop ramping the power and increase the rotor speed before power ramping continues to increase the output power by another 10%, thereby achieving the wind-optimal output power. In this manner, the blades can be pitched in to quickly ramp the output power to the defined percentage of the wind-optimal output power. The turbine can then enter partial-load operation (which is typically a slower power ramping technique) to continue ramping up to the wind-optimal output power.

Example Embodiments

FIG. 1 illustrates a diagrammatic view of a horizontal-axis wind turbine generator 100. The wind turbine generator 100 typically comprises a tower 102 and a wind turbine nacelle 104 located at the top of the tower 102. A wind turbine rotor 106 may be connected with the nacelle 104 through a low speed shaft extending out of the nacelle 104. The wind turbine rotor 106 comprises three rotor blades 108 mounted on a common hub 110 which rotate in a rotor plane, but may comprise any suitable number of blades, such as one, two, four, five, or more blades. The blade 108 (or airfoil) typically has an aerodynamic shape with a leading edge 112 for facing into the wind, a trailing edge 114 at the opposite end of a chord for the blade 108, a tip 116, and a root 118 for attaching to the hub 110 in any suitable manner.

For some embodiments, the blades 108 may be connected to the hub 110 using pitch bearings 120 such that each blade 108 may be rotated around its longitudinal axis to adjust the blade's pitch. The pitch angle of a blade 108 relative to the rotor plane may be controlled by linear actuators, hydraulic actuators, or stepper motors, for example, connected between the hub 110 and the blade 108.

Figure 2:
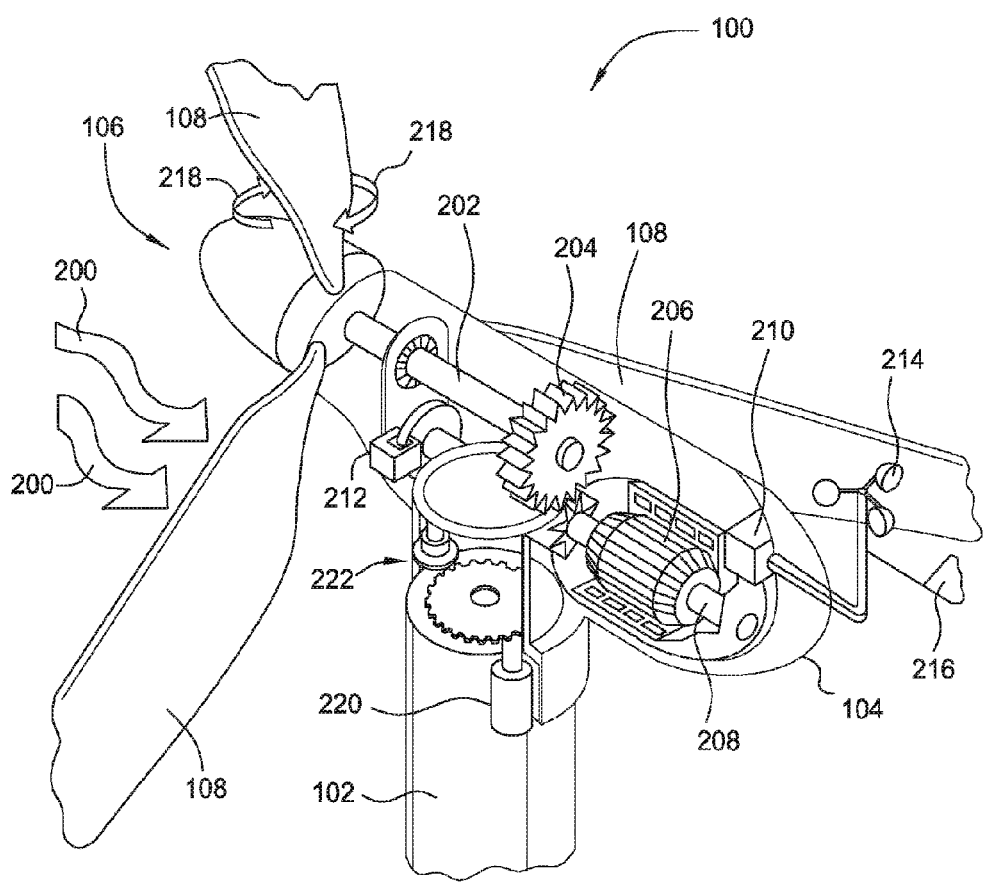
FIG. 2 illustrates a diagrammatic view of the components internal to the nacelle and tower of a wind turbine, according to an embodiment described herein.

FIG. 2 illustrates a diagrammatic view of typical components internal to the nacelle 104 and tower 102 of a wind turbine generator 100. When the wind 200 pushes on the blades 108, the rotor 106 spins and rotates a low-speed shaft 202. Gears in a gearbox 204 mechanically convert the low rotational speed of the low-speed shaft 202 into a relatively high rotational speed of a high-speed shaft 208 suitable for generating electricity using a generator 206.

A controller 210 may sense the rotational speed of one or both of the shafts 202, 208. If the controller decides that the shaft(s) are rotating too fast, the controller may signal a braking system 212 to slow the rotation of the shafts, which slows the rotation of the rotor 106—i.e., reduces the revolutions per minute (RPM). The braking system 212 may prevent damage to the components of the wind turbine generator 100. The controller 210 may also receive inputs from an anemometer 214 (providing wind speed) and/or a wind vane 216 (providing wind direction). Based on information received, the controller 210 may send a control signal to one or more of the blades 108 in an effort to adjust the pitch 218 of the blades. By adjusting the pitch 218 of the blades with respect to the wind direction, the rotational speed of the rotor (and therefore, the shafts 202, 208) may be increased or decreased. Based on the wind direction, for example, the controller 210 may send a control signal to an assembly comprising a yaw motor 220 and a yaw drive 222 to rotate the nacelle 104 with respect to the tower 102, such that the rotor 106 may be positioned to face more (or, in certain circumstances, less) upwind.

Figure 3:
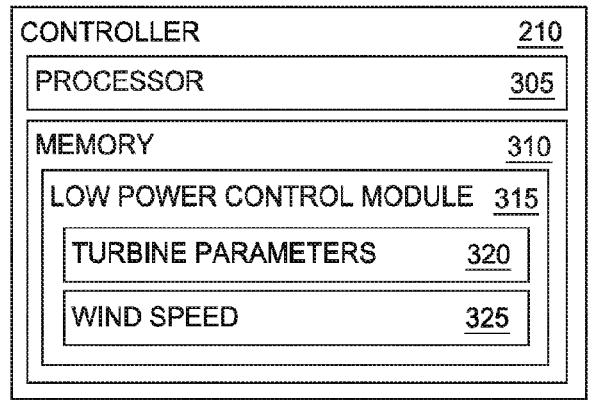
FIG. 3 illustrates a controller for operating a wind turbine in a low power mode, according to an embodiment described herein.

FIG. 3 illustrates a controller 210 for operating a wind turbine in a low power mode, according to an embodiment described herein. Controller 210 includes a processor 305 and memory 310. Processor 305 represents one or more processing elements that each may include one or more processing cores. Memory 310 may include volatile memory, non-volatile memory, or a combination of both. Furthermore, controller 210 may be located on the turbine 100 as shown in FIG. 2 or may located remotely of the turbine (e.g., as part of a supervisory control and data acquisition (SCADA) system).

Memory 310 includes a low power control (LPC) module 315 which controls the wind turbine when operating in a low power mode where the turbine's output power is de-rated. That is, even though the turbine could efficiently output more power, the LPC module 315 purposively de-rates or decreases the output power of the turbine. For example, the turbine may be designed to output 3 MW when the rated wind speed is achieved. However, in response from a request from a grid controller, the LPC module 315 may operate the turbine in the low power mode where the power is de-rated even if the current wind speed is at or above the rated wind speed. For example, the grid controller may request that the turbine output only 10% of the wind-optimal output power when in the low power mode. To de-rate the output power, the LPC module 315 may send instructions to a power converter or the generator to output only a fraction of its wind-optimal output power. However, reducing the output power also reduces the torque on the rotor. If the rotor speed is maintained at the same speed used to generate the wind-optimal output power, the turbine may experience smearing or torque reversals as described above. Thus, in some embodiments, the rotor speed is reduced when operating in the low power mode to mitigate the likelihood of structural damage to the drive train or gear box. But reducing the rotor speed may also prevent the output power from ramping quickly when the grid controller instructs the controller 210 to cease operating in the low power mode and increase the turbine's output power (i.e., ramp to full production). For example, the grid controller may identify a spike in customer demand in the grid, and in response, request that the turbine ramp quickly to satisfy this demand.

Figure 6:
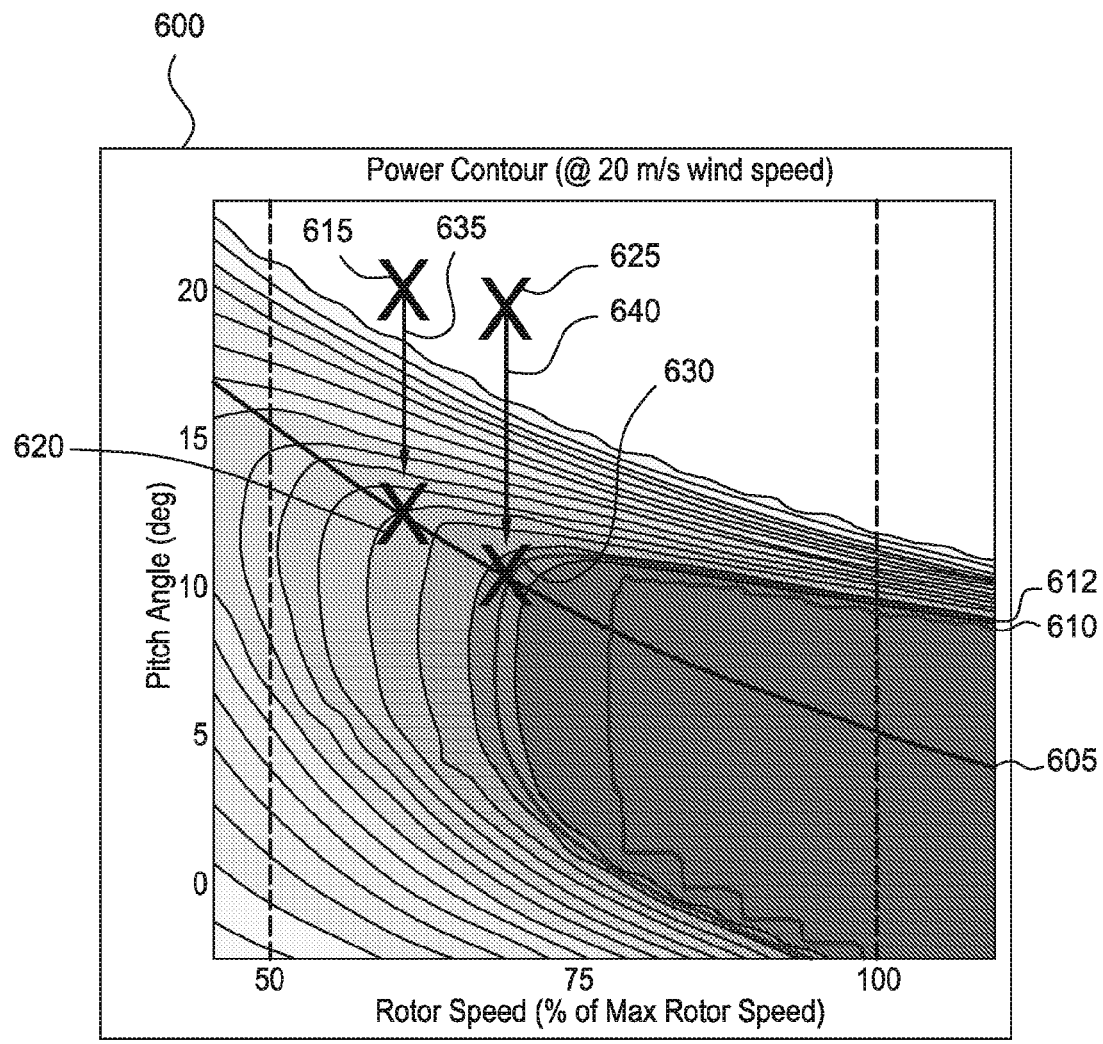
FIG. 6 is a graph illustrating changing blade pitch to ramp output power when no longer operating in the low power mode, according to an embodiment described herein.

To determine the rotor speed in the low power mode which permits fast ramping, the LPC module 315 includes turbine parameters 320 and wind speed 325. The turbine parameters 320 may be output power profiles and optimal pitch angles for the wind turbine at various wind speeds. However, the parameters 320 may vary depending on the type and configuration of the turbine. In one embodiment, the turbine parameters 320 may have been calculated or simulated beforehand so that the LPC module 315 can determine the power outputted by the turbine for different rotor speeds, blade pitch angles, wind speeds, and the like. An example chart illustrating turbine parameters 320 such as rotor speed, blade pitch angle, and output power at a particular wind speed (i.e., 20 m/s) is shown in FIG. 6 which will be described in more detail below.

The wind speed 325 may be the wind speed measured at the turbine using, for example, an anemometer mounted on the turbine. Alternatively, the anemometer may be external to the turbine and be used to derive or estimate the wind speed at the turbine (e.g., the anemometer may be upwind from the turbine). Furthermore, the wind speed 325 may be derived using a predicted wind speed. Thus, the wind speed 325 can be either a value actually measured at the turbine or a wind speed that is an estimation of the wind speed at the turbine. Using the turbine parameters 320 and the wind speed 325, the LPC module 315 controls the rotor speed in order to enable the turbine to ramp quickly from the de-rated power to the wind-optimal output power or some predefined percentage thereof.

Figure 4:
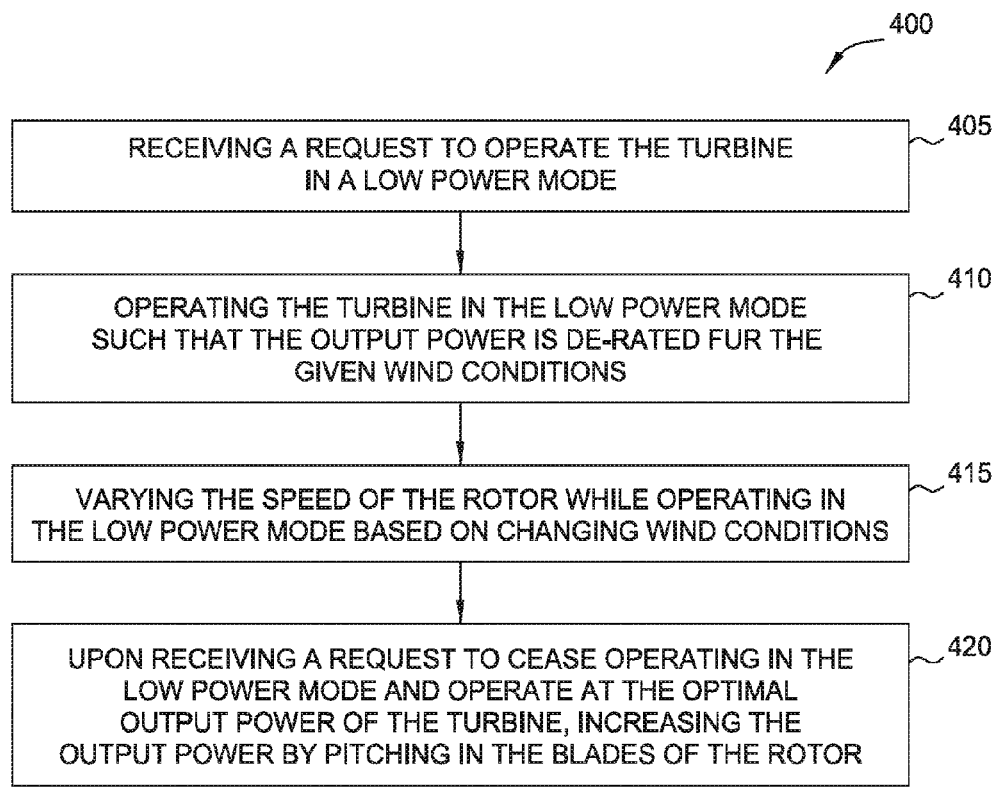
FIG. 4 is a method for determining rotor speed when operating in a low power mode, according to an embodiment described herein.

FIG. 4 is a method 400 for determining rotor speed when operating in a low power mode, according to an embodiment described herein. At block 405, the controller receives a request from a grid controller to operate the turbine in a low power mode. For example, the wind turbine (or a group of turbines in a wind park) may be used as a reserve power source. When demand for power on the grid is low, the grid controller instructs the turbine to operate in the low power mode. As demand increases, the grid controller can instruct the turbine controller to increase its output power.

At block 410, the controller passes control of the turbine to the LPC module which operates the turbine in the low power mode and de-rates the output power for the given wind conditions. That is, even though the turbine may be able to output its rated power (assuming the wind speed is at or above the rated wind speed), the LPC module de-rates the output power to a predefined value—e.g., 10% of the rated power.

Figure 5:
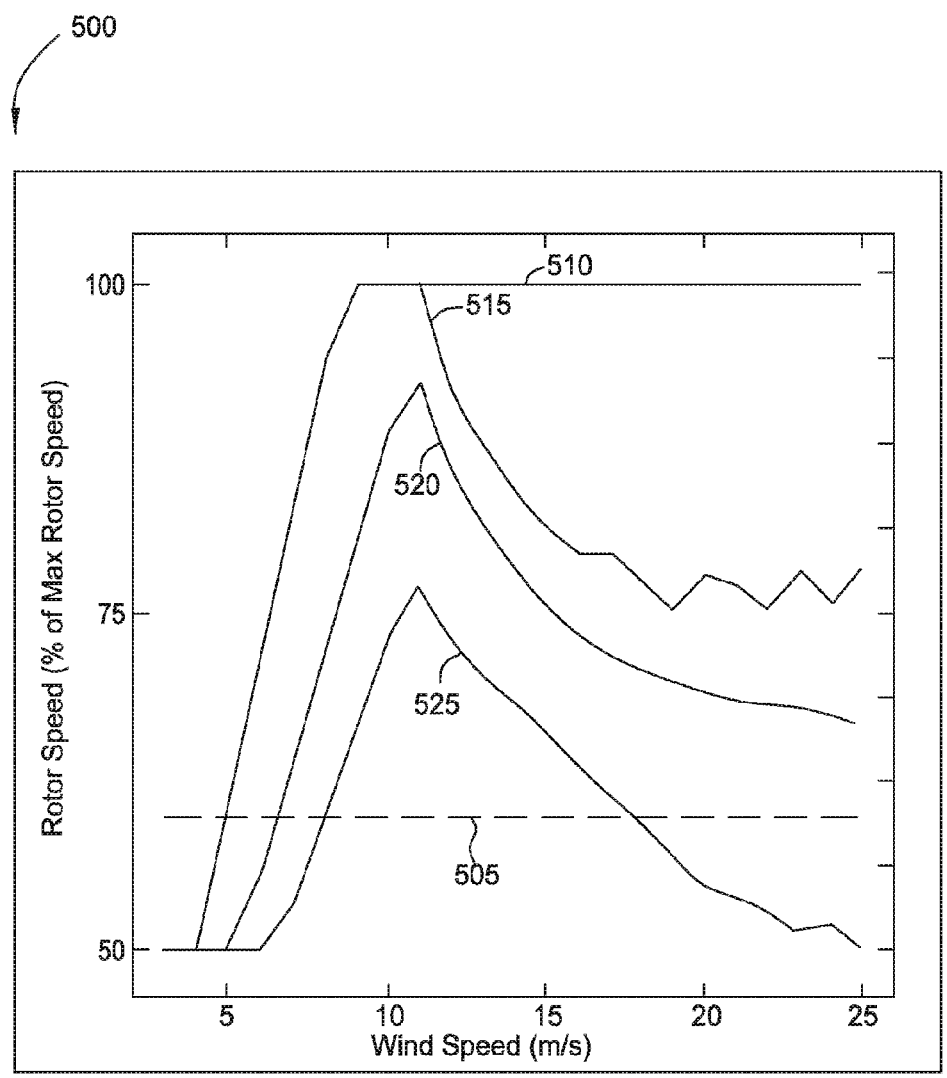
FIG. 5 is a graph illustrating varying the rotor speed based on wind speed when operating in a low power mode, according to an embodiment described herein.

At block 415, the LPC module varies the speed of the rotor while operating in the low power mode based on changing wind conditions. That is, the rotor speed varies as the wind speed at the turbines varies. FIG. 5 is a graph 500 illustrating varying the rotor speed based on wind speed when operating in a low power mode. As shown, graph 500 includes plots 515-525 of rotor speeds for ramping from the de-rated power (in this example 12% of the wind-optimal output power) to a predefined percentage of the wind-optimal output power only by pitching in the blades such that a face of the blade connecting the leading and trailed edges becomes more aligned with the rotor plane. However, in other designs, the output power of the wind turbine may be increased by pitching out the turbine blades such that the face is less aligned (i.e., further from being parallel) with the rotor plane.

As shown, plot 515 illustrates the rotor speed necessary for ramping from the de-rated power to 100% of the wind-optimal output power by pitching in the blades, while plot 520 illustrates the rotor speed necessary for ramping from the de-rated power to 90% of the wind-optimal output power by pitching in the blades, and plot 525 illustrates the rotor speed for ramping from the de-rated power to 60% of the wind-optimal output power by pitching in the blades. While graph 500 illustrates an example of a grid code stipulating that the low power mode operate the turbine at 12% the optimal power, this will vary depending on the requirements of the specific grid coupled to the wind turbine. For example, the grid code may request the turbine operate at 15% or less of the wind-optimal output power.

In contrast to plots 515-525 which vary according to wind speed, plot 505 illustrates maintaining a constant rotor speed when operating in the low power mode, which in this example is approximately 60% of the maximum rotor speed. While maintaining a low, constant rotor speed may mitigate the likelihood of smearing or torque reversals, the low rotor speed reduces the aerodynamic efficiency of the rotor, thereby resulting in the turbine being able to extract less energy from the wind. Thus, when the blades are pitched in at the rotor speed shown in plot 505, only a small power increase in power is achieved (e.g., less than 30-40% of the wind-optimal output power depending on the current wind speed). Instead, the rotor speed may need to first be increased before the power can be ramped significantly.

Plot 510 illustrates the rotor speed when the turbine achieves the wind-optimal output power for a given wind speed. For wind speeds below the rated wind speed (i.e., 8-9 m/s for this turbine), the wind-optimal output power is less than the rated power, but at wind speeds greater than the rated speed, the wind-optimal output power is the rated power. For wind speeds below the rated speed, the rotor speed is set to optimize aerodynamic efficiency. As the wind speed increases, the rotor speed and the output power of the wind turbine also increase until the rated wind speed is reached. After this point, although the wind speed increases, the controller may maintain the rotor speed at the maximum (i.e., 100%) rotor speed and the output power at the rated power. For example, the controller may begin to pitch out the blades on the turbine or use a brake in order to prevent the rotor speed from exceeding the maximum rotor speed. Although the turbine may be able to generate more power than the rated power when the wind speed exceeds the rated wind speed, doing so may harm the components in the turbine and reduce its estimated lifetime.

In one embodiment, when operating in the low power mode, the LPC module controls the rotor speed as shown in plot 510. Thus, as the wind speed increases, the LPC module increases the rotor speed by controlling the blade pitch until the maximum rotor speed is achieved. As such, if the grid controller requests that the turbine cease operating in the low power mode, the blades only need to be pitched to the optimal pitch angle in order for the turbine to generate the wind-optimal output power. That is, because the rotor speed is already at the speed corresponding to the optimal output power for the given wind speed, the turbine does not need to operate in a partial load mode where the rotor speed is increased. However, the disadvantage of controlling the rotor speed according to plot 510 is that these high speeds are likely to cause smearing or torque reversals which may reduce the lifespan of components in the turbine.

Generally, as the wind speed increases past the rated wind speed, the LPC module continues to pitch out the blades so that speed of the rotor does not increase past the maximum rotor speed. Stated differently, the wind contains more energy than can be extracted and converted into electrical energy by the turbine. Plots 515, 520, and 525 recognize that the greater the wind speed, the greater available energy that is accessible to the wind turbine. Thus, as the wind speed increases, the rotor speed can decrease and still extract the same amount of energy from the wind.

Referring specifically to plot 515, this line illustrates the rotor speeds that are required in order to pitch in the blades and go from 12% of the wind-optimal output power to 100% of the wind-optimal output power without needing to increase the rotor speed. For winds speeds above the rated wind, plot 515 illustrates the rotor speed required to ramp from 12% of the rated power to 100% of the rated power. Thus, assuming a wind speed at or above the rated wind speed, the turbine can ramp from 12% to 100% of the rated power just by pitching in the blades to the optimal blade angle for that current wind and rotor speeds. As shown, plot 515 has the same rotor speeds as plot 510 for wind speeds that are below approximately 11 m/s. However, for wind speeds greater than 11 m/s, the rotor speeds on plot 515 decrease relative to the rotor speeds on plot 510. That is, the rotor speeds do not need to be at the maximum rotor speed in order for the turbine to ramp from 12% to 100% of the rated power. For example, at 15 m/s, the rotor speed for plot 515 is approximately 80% of the maximum rotor speed. Thus, to ramp to 100% rated power, the LPC module pitches the blades to the optimal pitch angle for 15 m/s and a maintains the rotor speed at 80% of the maximum rotor speed to generate the rated power. In contrast, if the rotor speed is at the maximum rotor speed as shown in plot 510, then the LPC module must pitch in to an angle that is less than the optimal pitch angle for 15 m/s to generate the rated power. If the LPC module pitched in the blades to the optimal angle, then the generated power would exceed the rated power. Thus, plot 515 illustrates that the rotor speed does not need to be at the maximum rotor speed for wind speeds greater than the rated wind speed in order to ramp from the de-rated power to 100% of the rated power only by pitching in the blades. Advantageously, as the rotor speeds on plot 515 decrease, the likelihood of smearing and torque reversals also decreases. Unlike plot 510 where the likelihood of smearing and torque reversals occurring remains constant for wind speeds above the rate wind speed, for plot 515, this likelihood decreases as the rotor speeds decrease.

Plot 520 is similar to plot 515 except that this line indicates the rotor speeds necessary to ramp from 12% of the rated output power to 90% of the rated output power only by pitching the blades to the optimal pitch angle for the current wind and rotor speeds. Like plot 515, for wind speeds greater than 11 m/s, the rotor speed begins to decrease thereby reducing the likelihood that smearing or torque reversals will occur.

Because plot 520 includes rotor speeds where only 90% of the wind-optimal output power is achieved by pitching the blades to the optimal pitch angle, the LPC module may use other means to ramp the remaining 10% to achieve full production. Although the LPC module may be able to ramp the power to 100% of the wind-optimal power just by pitching in the blades, doing so may require the blade pitch angle to exceed the optimal blade pitch angle which slows down the rotor. As more and more energy is removed from the rotor (thereby slowing down the rotor), the turbine may experience a low-speed shutdown. Instead, the controller may operate in the partial-load mode and temporarily stop or reduce the rate of power ramping in order to increase the rotor speed. Once the rotor speed is increased, the controller finishes ramping the output power to the wind-optimal output power.

One advantage of using plot 520 to control rotor speed during low power operation rather than plot 515 is that, overall, the rotor speeds are slower. Thus, the likelihood of smearing and torques reversals occurring is reduced. However, one disadvantage of using plot 520 is that the LPC module cannot reliably ramp the output power to 100% of the wind-optimal output power only by pitching in the blades. That is, the turbine may need to increase the rotor speed relative to what is shown in plot 520 before the turbine can reliably generate the wind-optimal output power—i.e., avoid a low speed shutdown. Thus, plot 515 and 520 illustrate tradeoffs between preventing the wear-and-tear on the components in the turbine because of high rotor speeds and fast ramp times. If the grid code has a stringent requirement that the time to ramp from 12% to 100% of the wind-optimal output power can only be achieved in the time needed to pitch the blades to the optimal angles, then the LPC module may set the rotor speed according to plot 515. However, if the grid code is less stringent and provides extra time which can be used to increase the speed of the rotor, then the LPC module may set the rotor speed according to plot 520 and use the extra time to perform partial-load operation to ramp the output power from 90% to 100% of the wind-optimal output power.

If the grid code provides even more time to ramp the output power, then the LPC module may be able to set the rotor speed according to plot 525 where the output power can be ramped from 12% to 60% of the wind-optimal output power only by pitching in the blades. The remaining 40% of wind-optimal output power can be achieved by increasing the rotor speed while operating in the partial-load mode (or any other suitable power ramping technique).

In one embodiment, the LPC module calculates a plot that is customized for a particular grid code and turbine. For example, if the grid code permits 15 seconds to ramp from 12% to 100% of the wind-optimal output power, then the LPC module may control the rotor speed so the output power can ramp to 70% of the wind-optimal power by pitching the blades to the optimal blade angle. The controller may then operate in the partial-load mode to ramp the remaining 30%. However, if the grid code permits 20 seconds to ramp from 12% to 100% of the wind-optimal output power, the LPC module may control the rotor speed so that the output power can ramp to 63% of the wind-optimal power by pitching the blades to the optimal blade angle and use the partial-load operation to ramp the remaining 37%. However, these settings may vary based on the particular parameters of the turbine.

In one embodiment, the LPC module calculates the particular rotor speed when operating in the low power mode on the fly using the turbine parameters 320 and the wind speed 325 shown in FIG. 3. Alternatively, the LPC module may store pre-calculated rotor speeds (similar to the plots that are shown in FIG. 5) in memory. Using the current wind speed at the turbine, the LPC module can lookup the corresponding rotor speed.

In FIG. 5, the rotor speed may be updated either continuously (e.g., the LPC module constantly receives new wind speed data and determines updated rotor speed values) or at intervals. As an example of the latter, the LPC module may calculate a new rotor speed every five seconds. Alternatively, the LPC module may wait until the wind speed changes before calculating a new rotor speed. For example, the LPC module may update the rotor speed only after determining the wind speed has changed by 1% from the wind speed used to set the current rotor speed.

Returning to method 400, at block 415, the LPC module varies the speed of the rotor based on changing wind conditions at the turbine. As shown in graph 500, as the wind speed increases above the rated wind speed, the LPC module can decrease the rotor speed thereby decreasing the likelihood that smearing or torque reversals will occur. Moreover, in addition to varying with wind speed, the rotor speed is determined based on how much the power should be ramped by pitching the blades to their optimal pitch angle—e.g., 60% of the wind-optimal output power as shown by plot 525, 90% wind-optimal output power shown by plot 520, or 100% wind-optimal output power shown by plot 515.

In response to receiving a request from the grid controller to cease operating in the low power mode and operate at the wind-optimal output power, at block 420, the LPC module increases the output power by pitching in the blades to their optimal pitch angle. As mentioned above, an increase in customer demand for power from the grid may cause the grid controller to request that the turbine stop outputting the de-rated power and instead ramp to its wind-optimal output power. In other embodiments, the request to ramp the output power may originate from a SCADA controller or other controller within the wind park containing the turbine. For example, one of the turbines in the park may have failed and the SCADA controller may instruct the turbine (which was being held in reserve) to ramp its output power so that the total output power of the wind park remains constant.

FIG. 6 is a graph 600 illustrating changing blade pitch to ramp output power when no longer operating in the low power mode, according to an embodiment described herein. As shown, graph 600 illustrates the power outputted by a turbine for various pitch angles (the y-axis) and rotor speeds (the x-axis). To represent generated power, graph 600 is divided by a plurality of different grayscale power contours where the lighter contours represent lower output power and the darker contours represent higher output power. Generally, as the blades are pitched in (i.e., the blades become more aligned with the rotor plane) and the rotor speed increases, the greater power outputted by the turbine.

Graph 600 includes boundary 610 which illustrates an area in the chart where the turbine generates the rated power. That is, for all the combinations of pitch angles and rotor speeds that fall within the area defined by boundary 610, the turbine outputs the maximum rated power. Graph 600 also includes boundary 612 illustrating an area (which includes the area within boundary 610) where the turbine generates at least a predefined percentage of the rated power (e.g., 90% or more of the rated power). In addition, graph 600 includes plot 605 which illustrates the optimal pitch angle for the different rotor speeds and pitch angles at a wind speed of 20 m/s.

In one embodiment, the information contained within graph 600 (i.e., the optimal pitch angles and the relationship between the output power and the pitch angles and rotor speed) are the turbine parameters 320 described in FIG. 3 which are used by the LPC module 315 to select the rotor speed when operating in the low power mode. For example, the LPC module 315 may include similar power contour information as shown in FIG. 6 for other wind speeds—i.e., wind speeds other than 20 m/s. Using the wind speed and the information shown in FIG. 6, the LPC module can control the rotor speed such that upon receiving a request to ramp the output power, the module can pitch in the blades to the optimal pitch angle shown by plot 605 to ramp to the predefined percentage of the rated power.

Graph 600 illustrates the results from pitching in the turbine to ramp the output power at two different rotors speeds. Specifically, points 615 and 625 illustrate the power outputted by the turbine (which may be the same de-rated power) during low power operation. The rotor speed corresponding to point 615 is approximately 60-65% of the maximum rotor speed, while the rotor speed corresponding to point 625 is approximately 65-70% of the maximum rotor speed. In response to a request to increase the output power, by pitching the blades to the respective optimal pitch angles shown by plot 605, arrow 635 illustrates that output power ramps to point 620 and arrow 640 illustrates that the output power ramps to point 630. Because these transitions are performed by pitching in the blades, the turbine may ramp the output power within a few seconds. However, at point 620, the turbine generates less power than at point 630. Indeed, with the rotor speed at 60% of the maximum rotor speed, it is impossible for the turbine to output the same power outputted at point 630, regardless of the pitch angle. Thus, in order for the turbine to output the same power as the power outputted at point 630, the controller may increase the rotor speed, during which time the power may not ramp (or ramp at a much slower pace than the transition shown in arrows 635 and 640). For example, it may take the turbine three or four seconds to transition from point 615 to point 620 but take fifteen or twenty seconds to ramp from point 620 to point 630.

If achieving full production is desired, once at point 630, the controller may operate in a partial-load mode to increase the rotor speed such that the output power is the rated power. That is, the controller may increase the rotor speed to around 80% of the maximum rotor speed or greater. Once the faster rotor speed is reached, the controller may increase the output power so that the output power is within the region defined by boundary 610. Of course, if the rotor speed was at 80% of the maximum rotor speed or greater while in the low power mode, then the controller would only need to pitch in the blades such that the output power is within the area defined by boundary 610.

Figure 7:
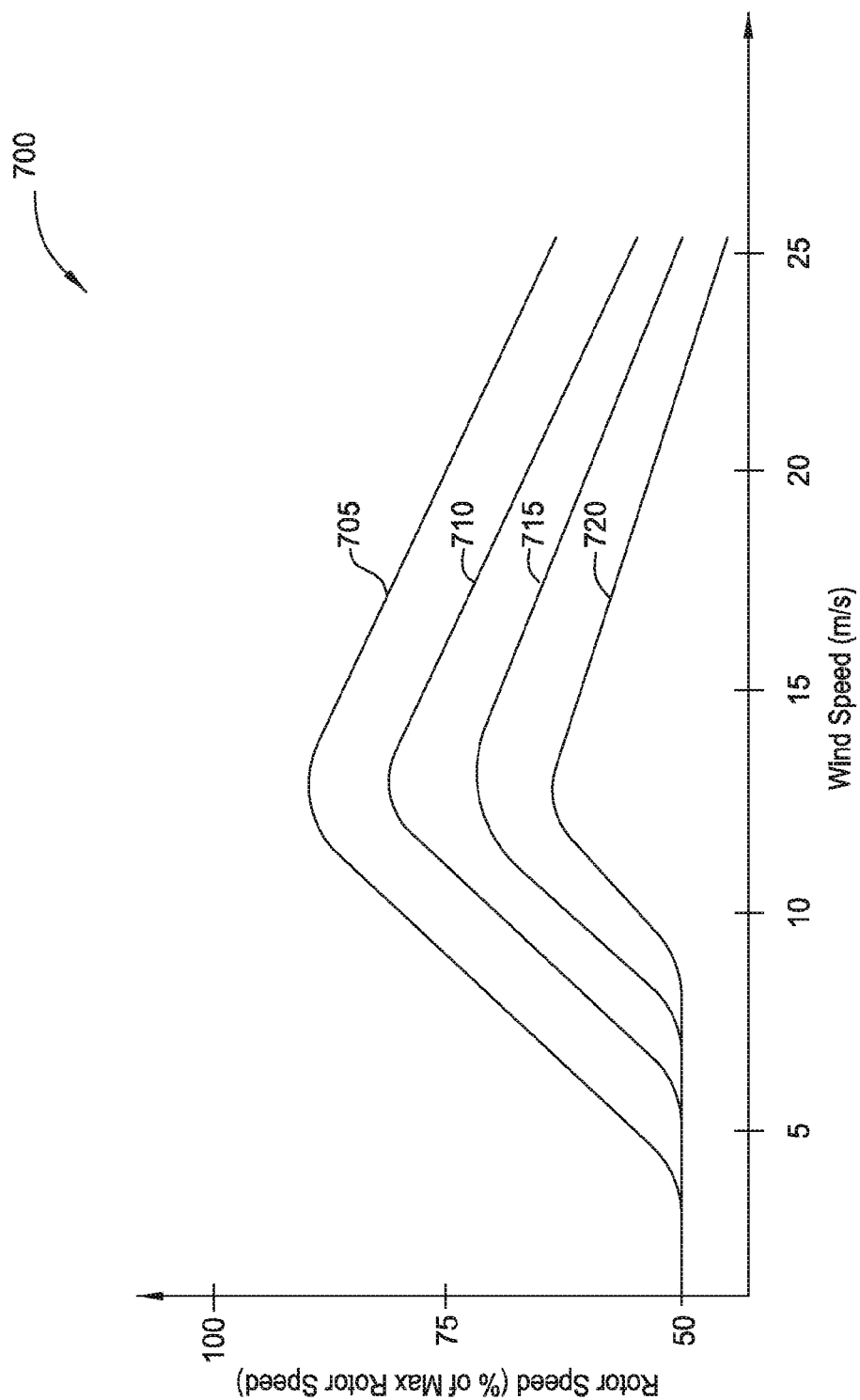
FIG. 7 is a graph illustrating control rotor speed at various de-rated output powers, according to an embodiment described herein.

FIG. 7 is a graph 700 illustrating rotor speeds at various de-rated output powers, according to an embodiment described herein. In one example, graph 700 represents how the LPC module adjusts the rotor speed based on different requests for de-rated power from a grid operator. For instance, if the grid requests that the wind turbine de-rate its power to 12% of the rated power, then the LPC module controls the rotor speed as shown by plot 705. Plots 710, 715, and 720 illustrate controlling the speed of the rotor if the grid requests that the turbine output 25%, 50%, and 75% of its rated power, respectively. Thus, graph 700 illustrates that the LPC module can respond to various requests that stipulate different de-rated output powers. Moreover, if the grid requests the wind turbine operate at a de-rated power that is not defined in chart 700 (e.g., 20% of the rated output power), the LPC module may derive the corresponding rotor speed by weighting or combining the plots in the chart 700—e.g., combining plots 705 and 710.

The plots for the different de-rated output powers vary according to the power ramp that the wind turbine operators wants to achieve by pitching the blades. That is, plots 705-720 vary depending on what percentage of power ramping should be achieved only by pitching in the blades. Referring again to FIG. 5, graph 500 illustrates the different rotor speeds for achieving different power ramps by pitching the blades when the output power is de-rated to 12% of the rated output power. If the wind turbine operator desires that 100% of the ramp be achieved by pitching the blades, then plot 705 in FIG. 7 will be the same as plot 515 in FIG. 5. However, if the wind operator only wants to achieve 90% output power by pitching the blades, then plot 715 will be the same as plot 520. The same adjustment may be made to the other plots 710-720 so that the turbine is compliant with the grid code stipulating the time for ramping from a de-rated power to the wind-optimal output power.

Although FIGS. 5 and 7 illustrate using continuous plots to control the rotor speed in response to changes in wind speed, in other embodiments, the LPC module may use estimates of the plots, such as a lookup table, that may include a finite number of controls points in the plots that can be used to derive the rotor speed from the current wind speed. Alternatively, the LPC module may approximate the plots shown in these graphs by using multiple straight-line segments thereby simplifying the control system.

In the preceding, reference is made to embodiments presented in this disclosure. However, the scope of the present disclosure is not limited to specific described embodiments. Instead, any combination of the features and elements provided above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer-readable storage medium (or media) having computer readable program instructions thereon for causing a processor to carry out aspects of the present invention.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A method of operating a wind turbine, the method comprising:
   operating, using one or more processors, the wind turbine in a low power mode that de-rates an output power of the wind turbine;
   while operating in the low power mode, controlling a rotor speed of a rotor of the wind turbine to vary based on changing wind speeds, such that the wind turbine remains capable of increasing the output power to a predefined percentage of an optimal output power only by pitching blades of the rotor and without causing a low-speed shutdown; and
   upon receiving a request to cease operating in the low power mode, increasing the output power of the wind turbine by pitching the blades of the rotor without first increasing the rotor speed.

2. The method of claim 1, wherein de-rating the output power of the wind turbine comprises:
   decreasing the output power of the wind turbine to be less than an optimal output power for a current wind speed at the wind turbine.

3. The method of claim 2, wherein increasing the output power of the wind turbine comprises:
   increasing the output power to the optimal output power for the current wind speed at the wind turbine.

4. The method of claim 1, wherein the predefined percentage of the optimal output power is less than 100 percent and the rotor speed is less than an aerodynamically optimal rotor speed at a current wind speed at the wind turbine, the method further comprising:
   after or while pitching the blades, increasing the rotor speed; and
   after or while increasing the rotor speed, increasing the output power to the optimal output power for the current wind speed.

5. The method of claim 1, wherein the predefined percentage of the optimal output power is 100 percent, wherein pitching the blades ramps the output power to the optimal output power for a current wind speed at the wind turbine.

6. The method as in claim 1, wherein for a set of wind speeds greater than a rated wind speed of the wind turbine, controlling the rotor speed comprises:
   decreasing the rotor speed as the wind speeds in the set of wind speeds increase.

7. A wind turbine, comprising:
   a rotor comprising blades; and
   a controller configured to:
      operate the wind turbine in a low power mode that de-rates an output power of the wind turbine;
      while operating in the low power mode, control a rotor speed of the rotor to vary based on changing wind speeds, such that the wind turbine remains capable of increasing the output power to a predefined percentage of an optimal output power only by pitching the blades and without causing a low-speed shutdown; and
      after ceasing to operate in the low power mode, increase the output power of the wind turbine by pitching the blades without first increasing the rotor speed.

8. The wind turbine of claim 7, wherein the controller is configured to de-rate the output power by decreasing the output power of the wind turbine to be less than an optimal output power for a current wind speed at the wind turbine.

9. The wind turbine of claim 8, wherein the controller is configured to increase the output power of the wind turbine by increasing the output power to the optimal output power for the current wind speed at the wind turbine.

10. The wind turbine of claim 7, wherein the predefined percentage of the optimal output power is less than 100 percent and the rotor speed is less than an aerodynamically optical rotor speed at a current wind speed at the wind turbine, the controller is configured to:
    after or while pitching the blades, increase the rotor speed; and
    after or while increasing the rotor speed, increase the output power to the optimal output power for the current wind speed.

11. The wind turbine of claim 7, wherein the predefined percentage of the optimal output power is 100 percent, wherein pitching the blades ramps the output power to the optimal output power for a current wind speed at the wind turbine.

12. The wind turbine as in claim 7, wherein for a set of wind speeds greater than a rated wind speed of the wind turbine, the controller is configured to decrease the rotor speed as the wind speeds in the set of wind speeds increase.

13. A non-transitory computer-readable storage medium storing computer-readable program code which, when executed on a processor, performs an operation comprising:
    operating a wind turbine in a low power mode that de-rates an output power of the wind turbine;
    while operating in the low power mode, controlling a rotor speed of a rotor of the wind turbine to vary based on changing wind speeds, such that the wind turbine remains capable of increasing the output power to a predefined percentage of an optimal output power only by pitching blades of the rotor and without causing a low-speed shutdown; and after ceasing to operate in the low power mode, increasing the output power of the wind turbine by pitching the blades without first increasing the rotor speed.

14. The computer-readable storage medium of claim 13, wherein de-rating the output power of the wind turbine comprises:

changing the output power of the wind turbine to be 15% of an optimal output power or less for a current wind speed at the wind turbine.

15. The computer-readable storage medium of claim 14, wherein increasing the output power of the wind turbine comprises:

increasing the output power to the optimal output power for the current wind speed at the wind turbine.

16. The computer-readable storage medium of claim 13, wherein controlling the rotor speed achieves a fast ramping as defined in a grid code.

17. The computer-readable storage medium of claim 13, wherein the predefined percentage of the optimal output power is less than 100 percent and the rotor speed is less than an aerodynamically optical rotor speed at a current wind speed at the wind turbine, the operation further comprising:

after or while pitching the blades, increasing the rotor speed; and after or while increasing the rotor speed, increasing the output power to the optimal output power for the current wind speed.

18. The computer-readable storage medium of claim 13, wherein for a set of wind speeds greater than a rated wind speed of the wind turbine, controlling the rotor speed comprises:

decreasing the rotor speed as the wind speeds in the set of wind speeds increase.

* * * * *